United States Patent [19]

Paulson

[11] 4,429,381

[45] Jan. 31, 1984

[54] STRAIGHT LINE TRACKING TURNTABLE

[76] Inventor: Rollie W. Paulson, 6119 9th Ave. South, Gulfport, Fla. 33707

[21] Appl. No.: 329,679

[22] Filed: Dec. 11, 1981

Related U.S. Application Data

[63] Continuation-in-part of Ser. No. 185,200, Sep. 8, 1980, abandoned.

[51] Int. Cl.$^3$ .............................................. G11B 3/60
[52] U.S. Cl. ................................................... 369/266
[58] Field of Search ............... 369/213, 220, 249, 264, 369/266

[56] References Cited

U.S. PATENT DOCUMENTS

| | | | |
|---|---|---|---|
| 2,391,784 | 12/1945 | Johnston | 369/213 |
| 2,479,640 | 8/1949 | Rieber | 369/213 |
| 2,628,842 | 2/1953 | Moore et al. | 369/213 |
| 2,740,633 | 4/1956 | Moore et al. | 369/213 |
| 4,083,565 | 4/1978 | Iyeta | 369/249 |
| 4,123,780 | 10/1978 | Honjo | 369/213 |
| 4,171,136 | 10/1979 | Nagaoka et al. | 369/249 |

*Primary Examiner*—Charles E. Phillips
*Attorney, Agent, or Firm*—Ronald E. Smith

[57] ABSTRACT

A straight line tracking turntable sound reproducing system. A conventional rotatably mounted turntable is unconventionally mounted on linear tracks for linear travel toward a substantially fixed position pivotally mounted stylus-carrying tone arm.

A servomechanism comprising a sensing device and a motor means controls the rate of linear travel of said turntable so that displacement of said tone arm is minimized. The sensing device detects displacement of the tone arm and signals the motor means to increase or decrease the rate of turntable linear motion as required.

Mechanical pinch clutch means are provided to allow manual re-positioning of said turntable to any preselected position along its linear path.

4 Claims, 2 Drawing Figures

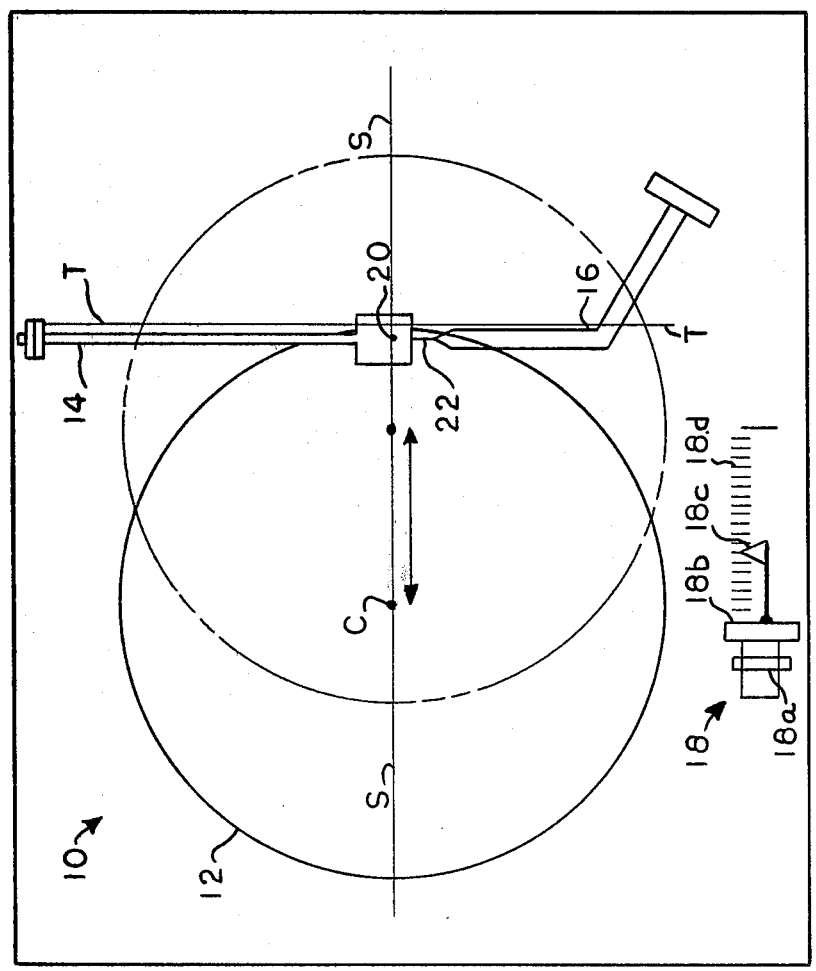

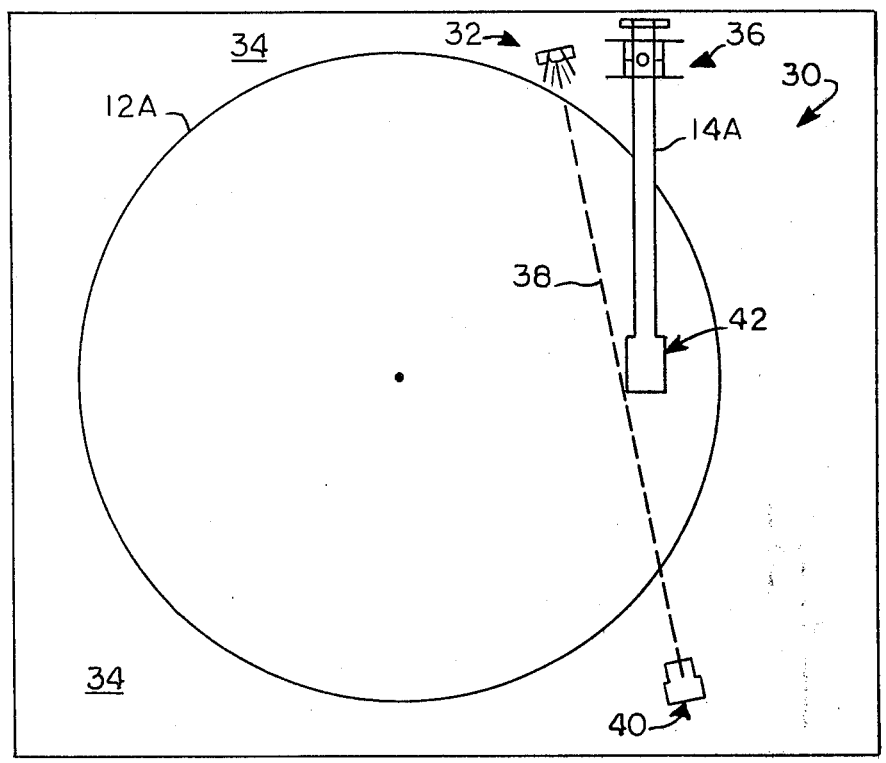
FIG_2

STRAIGHT LINE TRACKING TURNTABLE

CROSS-REFERENCE TO RELATED APPLICATIONS

This disclosure is a continuation-in-part of the disclosure filed Sept. 8, 1980, bearing Ser. No. 06/185/200, which earlier disclosure is co-pending with this disclosure now abandoned.

BACKGROUND OF THE INVENTION

1. Field of the Invention

This invention relates generally to servomechanisms, and more specifically to a servomechanism for sound reproducing equipment whereby the required relative movement between turntable and stylus is accomplished by maintaining the stylus-carrying tone arm in a substantially fixed position while causing the turntable to travel in a linear motion.

2. Description of the Prior Art

A well-known limitation of sound reproducing equipment such as phonograph players is the skating effect. Attempts to overcome this undesireable effect have resulted in tone arms of great complexity, in that the pivot portions thereof are provided with anti-skating mechanisms and other features.

The overly complicated tone arms are a direct result of the provision of moveable tone arms.

There is a need, therefore, for a sound reproducing system that has a fixed position tone arm. Such a mechanism would greatly reduce the cost of sound reproducing equipment by allowing use of conventional pivotally mounted tone arms having no anti-skating mechanisms therein.

No straight line tracking devices having non-moveable, pivotally mounted tone arms are being marketed.

SUMMARY OF THE INVENTION

The longstanding but heretofore unfulfilled need for a straight line tracking device having a substantially fixed position tone arm is now provided and disclosed herein.

Means are provided whereby a turntable advances linearly in a direction toward the stylus as a record is being played, at a rate of speed sufficient to maintain the stylus-carrying tone arm in a substantially fixed position.

A variable speed motor controls the rate of advance of the turntable toward the tone arm. A sensing device electronically linked to the tone arm detects displacements of the tone arm on a continual basis, and feeds back such information to the variable speed motor so that turntable linear speed is adjusted to maintain the substantially fixed position of the tone arm.

It is therefore an important object of the invention to provide a servomechanism capable of eliminating the conventional movement of tone arms attendant record playing.

A closely related object is to thereby provide straight line tracking so that the sound reproduction process is substantially similar to the sound recording process, thereby providing sound reproductions of higher tonal quality than attainable in earlier devices.

Another object is to provide a sound reproducing process that is free of skating effects even when conventional tone arms are employed.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawing, in which:

FIG. 1 is a top plan view, diagrammatically showing range of turntable linear travel, and the relative positioning of the tone arm, stylus, and sensing means during operation of the invention.

FIG. 2 is a top plan view of a second embodiment of the invention.

DETAILED DESCRIPTION OF THE PREFERRED EMBODIMENT

Referring now to FIG. 1, it will there be seen that an illustrative embodiment of the invention, generally designated 10, comprises a rotatably mounted turntable member 12, a conventional pivotally mounted tone arm 14, a sensing device 16, and a turntable positioning mechanism, designated 18 as a whole.

The turntable 12 is mounted on linear track members (not shown) that enable linear displacement of the turntable 12 in the directions shown by the double headed directional arrow. The solid line depicts the position of the turntable 12 relative to the tone arm 14 at the commencement of the record-playing procedure, and the phantom line depicts the position of the turntable 12 relative to the tone arm 14 at the completion thereof. It will be observed that the center C of the turntable 12 displaces toward the tone arm 14 as the sound reproducing process continues.

The tone arm is in spaced, parallel alignment with an imaginary line T that is tangent to the outer peripheral boundary of the turntable 12. The length of the tone arm 14 is chosen so that the stylus 20 carried by the tone arm 14 is in registration with a second imaginary line, designated S, that is orthogonal to the line T. Since the grooves formed in conventional records are of spiral configuration, the aforesaid positioning of the stylus assures that it will be centered in the path of the rotational travel of the grooves.

The sensing device 16 and the tone arm 14 are optoelectronically connected. A lamp 21, shutter 23, and CdS cell co-act in the known manner to provide the sensing function. For example, if the rate of linear travel of the turntable 12 from the left toward the right as shown in FIG. 1 is too high, the pivotally mounted tone arm 14 will pivot in a levorotational (counterclockwise) direction. If the rate of linear travel is too low, dextrorotation (clockwise) will be observed. It is a function of the sensing device to detect such levo or dextrorotation and to initiate corrective action to eliminate or substantially diminish such undesired tone arm movement.

Upon detecting a given amount of tone arm 14 displacement, the sensing means sends a signal to a motor means (not shown) that controls the rate of speed of the turntable's linear motion. The strength of the signal is directly proportional to the amount of displacement detected. More specifically, the sensing means 16 increases the amount of current to the motor means if turntable 12 linear motion is too slow (as when tone arm 14 undergoes dextrorotation ), and decreases the amount of current thereto if the tone arm 14 undergoes levorotation, the amount of increase or decrease being directly proportional to the amount of displacement of the tone arm 14 detected by the sensing means 16. Of course, the motor means that receives such variable current is a variable speed motor. Although the specific construction of the sensing means 16 does not per se form a part of this invention, the required construction will be apparent to those skilled in the electrical arts generally, as well as to those skilled in the art of servomechanisms.

Those skilled in feedback theory will also appreciate that the phenomenon known as "hunting" will naturally occur as corrective actions continually overshoot the optimal speed of the turntable 12 in a linear direction. It is the above-described postioning of the stylus and hence of the tonearm (relative to imaginary lines S and T as aforesaid) that reduces the amount of hunting to an acceptable level.

To manually re-position the turntable 12 to any preselected position, the mechanism 18 is provided. Depressing button 18a, a pinch clutch, allows manipulation of lever 18b which in turn is connected to the turntable 12 by a mechanical linkage that is not shown. A pointer or cue 18c positioned slightly above a graduated scale 18d provides an analogue reading of the turntable position.

Another linkage, not shown, raises the tone arm 14 when the pinch clutch 18a is depressed, so that the stylus 20 will not be damaged by movement of the turntable 12 attendant manipulation of lever 18b.

DETAILED DESCRIPTION OF A SECOND EMBODIMENT

A second embodiment is shown diagrammatically in FIG. 2, and is generally designated 30.

In this embodiment, a pencil type beam lamp 32 is fixedly secured to a stationary support surface 34, adjacent the pivotal support means 36 for the tone arm 14A, as shown. The lamp 32 directs a thin beam of light, indicated as 38, toward a common photo cell 40. The cell 40 is immovably mounted on the same support surface 34 which the lamp 32 is mounted on.

An important difference between this second embodiment 30 and the first-described embodiment 10 is that the motor means (not shown) that drives the turntable 12A from left to right, as depicted in FIG. 2, is a constant speed motor. The first-described embodiment contemplated the use of a variable speed motor that would speed up or slow down the movement of the turntable responsive to signals from the sensor 16. Thus the first-described embodiment is somewhat similar to prior art devices, whereas the embodiment now being described is believed to be unanticipated by the prior art in that the motor employed is a constant speed motor.

The teachings of the prior art actually teach against the use of a constant speed motor, since the prior art teaches that a continuous "hunting" is the optimal method for maintaining the desired groove/stylus positioning.

In sharp contrast to prior art devices, the analog method of tracking is foregone in embodiment 30, and a digital-type method is employed instead. More specifically, the speed of the motor means is fixed at a constant rate which is set slightly faster than the speed at which it would be set if the analog methods of the prior art were to be employed. Thus, when the motor is not operating, the turntable 12A will be stationary and the pivotally mounted cartridge housing will describe an arcuate loci relative to the fulcrum point 36. When the housing 42 travels from right to left as seen in FIG. 2, it will be noted that such travel will cause the housing 42 to interrupt the light beam 38. This interruption of the light beam 38, as sensed by the photo cell 40, will activate the constant speed motor. The turntable 12A will then begin traveling from left to right as seen in FIG. 2, at a speed slightly faster than that speed which would theoretically maintain the optimal groove/stylus relationship. Accordingly, the turntable will drive the housing 42 from left to right as seen in FIG. 2. In this manner, the light beam 38 becomes continuous again between its source 32 and its destination 40. When photo cell 40 detects the presence of light 38, the motor is stopped, and the turntable 12A again begins its wait for the housing 42 to pivot, from right to left, into beam 38-interrupting relation again, upon which occurence the cycle repeats itself.

It should be noted that this start and stop technique provides even wear patterns on the stylus. The stylus is bearing against one side of the groove as such stylus travels from right to left when the motor is not operating, and bears against the other side of the groove when the motor is operating, thereby driving the turntable and hence the stylus from left to right.

The photo cell 40 is provided with a delay means so that the turntable 12A continues its travel for a moment after the light beam is restored, so that the start and stop movements are not too closely spaced in time.

It is apparent that the housing 42 acts as a day/night means for the photo cell 40, and in this manner the condition sought to be monitored is directly monitored, in the absence of reflecting surfaces often found in prior art devices.

Tests of the above-described system have shown that the movement of the stylus is restricted to a very small range, as is desireable. The digital on/off approach of starting and stopping a constant speed motor is believed to be desireable vis a vis the analog approach of earlier devices. The setting of the speed of the motor such that the turntable drives the stylus "backwards" until the beam of light 38 is restored to its continuous condition is a very important feature of this invention. The oscillating travel of the tone arm 14A is, in effect, an analog type function that continuously approximates the theoretically unreachable groove/stylus optimal position. Thus, the invention incorporates the best features of digital and analog systems by harnessing both of such systems, in that digital means control the degree and frequency of stylus oscillations while analog means continuously vary the position of the stylus within the groove during the moments that the digital means are non-operative.

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
That which is claimed is:
1. A sound reproducing device, comprising, a horizontally disposed, rotatably mounted turntable member, a first motor means for rotating said turntable member at a substantially uniform rate of speed so that a record member disposed in supported relation thereupon rotates at a substantially uniform rate of speed conjointly therewith, a second motor means for imparting linear motion, along a predetermined path, to said turntable member, said path coincident with an axis of symmetry of said turntable member, a pivotally mounted tone arm member, a stylus member carried by said tone arm member so that the free end of said stylus member operatively engages the spiral grooves formed in said record member, said tone arm disposed in spaced parallel relation to a first imaginary line tangent to the outer peripheral boundary of said turntable member, said stylus further disposed in registration with a second imaginary line perpendicular to said first imaginary line, said second imaginary line coincident with the predetermined path along which said turntable member travels, a sensing means for detecting angular displacement of said tone arm member, said sensing means adapted to provide a signal to said second motor means to increase or decrease the rate of turntable linear motion along said path by an amount sufficient to prevent said tone arm member from undergoing angular rotation relative to its pivotal mount attendant operation of the device, said second motor means including a constant speed motor that drives said turntable member at a predetermined speed that is slightly greater than the speed that would be required to maintain the initial position of the stylus during the time said record member is rotating conjointly with said turntable.

2. The device of claim 1, further comprising, a lamp member for directing a narrow beam of radiation to a predetermined target means, said predetermined target means comprising a radiation-sensitive device, said predetermined target means disposed in spaced relation to said lamp member, said tone arm member having a stylus-carrying end that is disposed in beam-interrupting position to said beam of radiation and said radiation-sensitive device when said stylus-carrying end has pivoted into such beam-interrupting position responsive to rotation of said turntable member.

3. The device of claim 2, wherein said second motor means is operatively connected to said radiation-sensitive device so that when said beam is interrupted, said second motor means is activated for a predetermined length of time, thereby driving said stylus-carrying end of said tone arm member out of beam-interrupting relation, which movement deactivates said second motor means so that when the stylus-carrying end of said tone arm member pivots about its fulcrum, at the conclusion of said predetermined length of time, such beam is again interrupted and said second motor means is reactivated, so that the cycle is repeated.

4. The device of claim 3, wherein a delay of a predetermined length of time is provided to delay the reactivation of said second motor means after said beam has re-entered its uninterrupted status so that said second motor means does not reactivate and deactivate at overly frequent intervals of time.

* * * * *